(12) United States Patent
Kawasaki et al.

(10) Patent No.: US 9,550,842 B2
(45) Date of Patent: Jan. 24, 2017

(54) ACRYLIC ELASTOMER, ACRYLIC ELASTOMER COMPOSITION, LAMINATE, CROSSLINKED PRODUCT, AND MOLDED ARTICLE

(71) Applicant: DENKI KAGAKU KOGYO KABUSHIKI KAISHA, Tokyo (JP)

(72) Inventors: Takashi Kawasaki, Ichihara (JP); Tsutomu Kobari, Ichihara (JP); Jo Shinbori, Ichihara (JP)

(73) Assignee: DENKA COMPANY LIMITED, Tokyo (JP)

( * ) Notice: Subject to any disclaimer, the term of this patent is extended or adjusted under 35 U.S.C. 154(b) by 0 days.

(21) Appl. No.: 14/646,334

(22) PCT Filed: Nov. 20, 2013

(86) PCT No.: PCT/JP2013/081292
§ 371 (c)(1),
(2) Date: May 20, 2015

(87) PCT Pub. No.: WO2014/080948
PCT Pub. Date: May 30, 2014

(65) Prior Publication Data
US 2015/0259469 A1    Sep. 17, 2015

(30) Foreign Application Priority Data

Nov. 21, 2012  (JP) ................. 2012-254797

(51) Int. Cl.
| | |
|---|---|
| *C08F 20/22* | (2006.01) |
| *C08F 20/26* | (2006.01) |
| *C08F 20/32* | (2006.01) |
| *C08F 220/22* | (2006.01) |
| *C08F 220/26* | (2006.01) |
| *C08F 220/32* | (2006.01) |
| *C08K 5/49* | (2006.01) |
| *C08K 5/14* | (2006.01) |
| *C08K 5/19* | (2006.01) |

(Continued)

(52) U.S. Cl.
CPC ............... *C08F 20/22* (2013.01); *B32B 7/12* (2013.01); *B32B 27/08* (2013.01); *B32B 27/22* (2013.01); *B32B 27/306* (2013.01); *C08F 20/26* (2013.01); *C08F 20/32* (2013.01); *C08F 220/18* (2013.01); *C08F 220/22* (2013.01); *C08F 220/26* (2013.01); *C08F 220/32* (2013.01); *C08G 63/682* (2013.01); *C08G 63/91* (2013.01); *C08J 3/24* (2013.01); *C08K 5/0025* (2013.01); *C08K 5/14* (2013.01); *C08K 5/19* (2013.01); *C08K 5/49* (2013.01); *C08K 5/50* (2013.01); *C08L 33/16* (2013.01); *B32B 2270/00* (2013.01); *B32B 2307/51* (2013.01); *B32B 2307/518* (2013.01); *B32B 2307/54* (2013.01); *C08F 2220/325* (2013.01); *C08J 2333/06* (2013.01); *C08J 2333/16* (2013.01); *F16L 11/04* (2013.01)

(58) Field of Classification Search
CPC ........... C08F 20/22; C08F 20/26; C08F 20/32; C08F 220/28; C08F 220/32; C08F 220/22; C08F 220/26; C08F 2220/325; C08K 5/14; C08K 5/19; C08K 5/49; C08K 5/50; C08K 5/0025; C08L 33/16; C08J 3/24; C08J 2333/16; C08J 2333/06; B32B 27/22; B32B 27/08; B32B 27/306; B32B 7/12; B32B 2270/00; B32B 2307/54; B32B 2307/51; B32B 2307/518; C08G 63/91; C08G 63/682; F16L 11/04
See application file for complete search history.

(56) References Cited

U.S. PATENT DOCUMENTS

| | | | |
|---|---|---|---|
| 3,976,627 A |   | 8/1976 | Morris ........................ 526/14 |
| 4,237,258 A | * | 12/1980 | Cantalupo ............ C08F 220/12 |
|   |   |   | 525/327.3 |

(Continued)

FOREIGN PATENT DOCUMENTS

| | | |
|---|---|---|
| FR | 2 286 856 | 10/1975 |
| JP | H 3-67637 A | 3/1991 |

(Continued)

OTHER PUBLICATIONS

International search Report dated Feb. 25, 2014, issued to PCT/JP2013/081292.

(Continued)

*Primary Examiner* — Robert Jones, Jr.
(74) *Attorney, Agent, or Firm* — Stein IP, LLC

(57) ABSTRACT

Provided are an acrylic elastomer superior in adhesiveness to a fluorine-based elastomer, an acrylic elastomer composition containing the same, its laminate, and its crosslinked product and a molded article therefrom. Iodine groups are introduced as crosslinking groups into an acrylic elastomer to an iodine content of 0.1 to 2 mass % with respect to the total mass of the elastomer. In addition, 1 to 7 parts by mass of an organic peroxide and 1 to 5 parts by mass of an onium salt were blended with 100 parts by mass of the acrylic elastomer, to give an acrylic elastomer composition. Further, an acrylic elastomer layer of the acrylic elastomer composition is laminated with a fluorine-based elastomer layer of a fluorine-based elastomer composition mainly containing of a fluorine-based elastomer having iodine groups as crosslinking groups, to give a laminate. The laminate is then crosslinked to give a crosslinked product and a molded article.

11 Claims, 1 Drawing Sheet

(51) Int. Cl.
| | |
|---|---|
| *C08K 5/50* | (2006.01) |
| *C08L 33/16* | (2006.01) |
| *C08F 220/18* | (2006.01) |
| *C08K 5/00* | (2006.01) |
| *C08G 63/682* | (2006.01) |
| *C08G 63/91* | (2006.01) |
| *B32B 7/12* | (2006.01) |
| *B32B 27/08* | (2006.01) |
| *B32B 27/22* | (2006.01) |
| *B32B 27/30* | (2006.01) |
| *C08J 3/24* | (2006.01) |
| *F16L 11/04* | (2006.01) |

(56) References Cited

U.S. PATENT DOCUMENTS

| | | | | |
|---|---|---|---|---|
| 4,650,834 A | * | 3/1987 | Yagishita | C08C 19/40 525/208 |
| 5,374,484 A | * | 12/1994 | Kasahara | C08K 3/26 428/421 |
| 2004/0162380 A1 | | 8/2004 | Kojima et al. | 524/462 |
| 2007/0083000 A1 | | 4/2007 | Kojima et al. | 524/500 |
| 2013/0090424 A1 | | 4/2013 | Ikari et al. | 524/548 |
| 2013/0090434 A1 | | 4/2013 | Clapper et al. | 525/419 |

FOREIGN PATENT DOCUMENTS

| | | | |
|---|---|---|---|
| JP | 08-053595 | * | 11/1994 |
| JP | 2000-143919 A | | 5/2000 |
| JP | 2002-59486 A | | 2/2002 |
| JP | 2004-250520 A | | 9/2004 |
| JP | 2009-91437 A | | 4/2009 |
| JP | 2009-234216 A | | 10/2009 |
| JP | 2010-42669 A | | 2/2010 |
| WO | EP 0 957 127 A1 | | 3/1999 |
| WO | WO 2011/162004 A1 | | 12/2011 |

OTHER PUBLICATIONS

Written Opinion dated Nov. 20, 2013, issued to PCT/JP2013/081292.

Extended European search report dated May 19, 2016, issued by the European Patent Office in corresponding application 13857491.8.

* cited by examiner

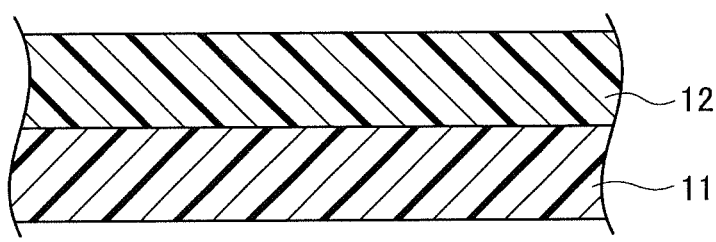

ACRYLIC ELASTOMER, ACRYLIC ELASTOMER COMPOSITION, LAMINATE, CROSSLINKED PRODUCT, AND MOLDED ARTICLE

CROSS-REFERENCE TO RELATED APPLICATIONS

This application is a national stage of International Application No. PCT/JP2013/081292, filed Nov. 20, 2013, which claims the benefit of priority to Japanese Application No. 2012-254797, filed Nov. 21, 2012, in the Japanese Patent Office, the disclosures of which are incorporated herein by reference.

TECHNICAL FIELD

The present invention relates to an acrylic elastomer, an acrylic elastomer composition, its laminate, and its crosslinked product and a molded article therefrom. More specifically, it relates to an acrylic elastomer and an acrylic elastomer composition to be laminated with a fluorine-based elastomer, its laminate, and its crosslinked product and a molded article therefrom.

BACKGROUND ART

Acrylic elastomers and crosslinked products thereof are superior in physical properties including heat oxidizing resistance, oil resistance, mechanical properties, and compression set properties and have been used widely as the materials for hose parts, seal parts, and antivibration rubber parts in automobile engine room. Under increasing demand for extensive exhaust gas purification and higher engine output, there is recently a need for materials higher in heat oxidizing resistance and acid resistance for these automobile parts.

For example, a fluorine-based elastomer, which is higher in durability and acid resistance than acrylic elastomers, may be used to increase reliability of rubber parts by improving these properties. However, such a fluorine-based elastomer is lower in low-temperature resistance and also expensive and thus, not suited as a material for auto parts that demand low cost and high reliability simultaneously.

Accordingly, a method of using a fluorine-based elastomer and another elastomer in combination was proposed. For example, it is possible to improve practical durability by laminating a fluorine-based elastomer on the region that has particularly a problem of durability.

On the other hand if a laminate is formed with a fluorine-based elastomer, an important property demanded for the laminate is interlayer adhesiveness thereof. When the interlayer adhesion strength is low, the laminate is less reliable. In particular, as fluorine-based elastomers are less adhesive to other materials, it is extremely important, for preparation of a less-expensive laminate superior in durability from a fluorine-based elastomer and an acrylic elastomer, to increase the adhesion strength of these elastomer layers.

Methods of increasing the adhesiveness of a fluorine-based elastomer include a method of treating the surface of a fluorine-based elastomer layer with metal sodium solution (see, for example, Patent Document 1), a method by discharge treatment (see, for example, Patent Document 2), a method by plasma treatment (see, for example, Patent Document 3), and others. Also proposed was a laminate with physical properties (such as low-temperature embrittlement resistance) and adhesiveness to non-fluorine rubber layers improved by mixing a fluoroplastic resin in a particular structure with a fluorine rubber (see, for example, Patent Document 4).

CITATION LIST

Patent Literatures

[Patent Document 1] JP-A No. H03-67637
[Patent Document 2] JP-A No. 2002-59486
[Patent Document 3] JP-A No. 2009-234216
[Patent Document 4] JP-A No. 2010-42669

SUMMARY OF INVENTION

Technical Problem

However, the surface treatments described in Patent Documents 1 to 3 only make the production process complicated, leading to increase of the production cost of the laminates such as hose products. In addition, such a surface treatment may result in deterioration of the sealing property of the laminate by degradation of the elastomer layer. Alternatively, the method described in Patent Document 4, which uses only a fluorine-based elastomer in a particular structure, demand a fluorine elastomer restricted in its kind, making it difficult to design freely the properties of the laminate, such as flexibility, according to the application thereof.

Accordingly, an object of the present invention is to provide an acrylic elastomer superior in adhesiveness to a fluorine-based elastomer, an acrylic elastomer composition containing it, its laminate, and its crosslinked product and a molded article therefrom.

Solution to Problem

The acrylic elastomer according to the present invention contains iodine groups as crosslinking groups and the iodine content is 0.1 to 2 mass % with respect to the total mass of the elastomer.

The acrylic elastomer may contain additionally at least one crosslinking group selected from the group consisting of epoxy, carboxy, and active chlorine and, in such a case, the content of the crosslinking group component other than iodine group is 1.5 mass % or less with respect to the total mass of the elastomer.

The acrylic elastomer composition according to the present invention contains 100 parts by mass of the acrylic elastomer described above, additionally 1 to 7 parts by mass of an organic peroxide, and 1 to 5 parts by mass of an onium salt.

The organic peroxide for use may be, for example, a peroxyketal and/or a dialkyl peroxide.

Alternatively, the onium salt for use may be, for example, an organic ammonium salt and/or an organic phosphonium salt.

The laminate according to the present invention is a laminate of an acrylic elastomer layer of the acrylic elastomer composition described above and a fluorine-based elastomer layer of a fluorine-based elastomer composition containing mainly a fluorine-based elastomer containing iodine groups as crosslinking groups.

The crosslinked product according to the present invention is a product obtained by crosslinking the laminate above.

The molded article according to the present invention is made of the crosslinked product described above and it is, for example, a hose component, a seal component, or an antivibration rubber component.

Advantageous Effects of Invention

It is possible according to the present invention to form an acrylic elastomer layer that is superior in interlayer adhesiveness to a fluorine-based elastomer layer.

BRIEF DESCRIPTION OF DRAWINGS

FIG. 1 is a cross-sectional view illustrating the configuration example of the laminate in the third embodiment of the present invention.

DESCRIPTION OF EMBODIMENTS

Hereinafter, favorable embodiments of the invention will be described in detail with reference to drawings. However, it should be noted that the present invention is not restricted by the embodiments described below.

First Embodiment

The acrylic elastomer in the first embodiment of the present invention comprises iodine groups as crosslinking groups and has an iodine content of 0.1 to 2 mass % with respect to the total mass of the elastomer.

The acrylic elastomer in the present embodiment is a copolymer of a (meth)acrylic acid alkyl ester and an iodine group-containing crosslinkable monomer (iodine compound). The "crosslinkable monomer" above is a monomer having a functional group that constitutes a crosslinkable site (crosslinking site). The acrylic elastomer in the present embodiment may be copolymerized, as needed, with other monomers such as vinyl acetate and ethylene or with a crosslinkable monomer containing a crosslinking group other than iodine group such as epoxy, carboxy, or active chlorine.

[(Meth)Acrylic Acid Alkyl Ester]

The (meth)acrylic acid alkyl ester is the component that forms the skeleton of the acrylic elastomer and it is possible by proper selection of its kind to regulate basic properties of the acrylic elastomer composition obtained such as normal-state physical properties, low-temperature resistance, and oil resistance. The "(meth)acrylic acid alkyl ester" above is synonymous with (meth)acrylate and include both methacrylic acid alkyl ester (methacrylate) and acrylic acid alkyl ester (acrylate).

Typical examples of the methacrylic acid alkyl esters include methyl (meth)acrylate, ethyl (meth)acrylate, n-propyl (meth)acrylate, n-butyl (meth)acrylate, isobutyl (meth)acrylate, n-pentyl (meth)acrylate, isoamyl (meth)acrylate, n-hexyl (meth)acrylate, 2-methylpentyl (meth)acrylate, n-octyl (meth)acrylate, 2-ethylhexyl (meth)acrylate, n-decyl (meth)acrylate, n-dodecyl (meth)acrylate, n-octadecyl (meth)acrylate, and the like.

Typical examples of the acrylic acid alkyl esters include 2-methoxyethyl acrylate, 2-ethoxyethyl acrylate, 2-(n-propoxy)ethyl acrylate, 2-(n-butoxy)ethyl acrylate, 3-methoxypropyl acrylate, 3-ethoxypropyl acrylate, 2-(n-propoxy)propyl acrylate, 2-(n-butoxy)propyl acrylate, and the like.

Examples of the (meth)acrylic acid alkyl esters, which constitute the acrylic elastomer in the present embodiment, is not limited to the methacrylic acid alkyl esters and the acrylic acid alkoxyalkyl esters described above. These (meth)acrylic acid alkyl esters may be used alone or in combination of two or more.

It is possible to adjust the low-temperature resistance and the oil resistance of the composition or the crosslinked product therefrom, by adjusting the blending amounts of these unsaturated monomers during copolymerization. For example when an acrylic elastomer is prepared from ethyl acrylate and n-butyl acrylate, it is possible to improve the low-temperature resistance by increasing the copolymerization ratio of n-butyl acrylate and to improve the oil resistance by increasing the copolymerization ratio of ethyl acrylate.

[Crosslinkable Monomer]

The crosslinkable monomer is copolymerized with the (meth)acrylic acid alkyl ester, to make the resulting elastomer cocrosslinkable with other elastomer layer and thus to improve the interlayer adhesiveness of the laminate obtained. The acrylic elastomer in the present embodiment should contain an iodine group-containing crosslinkable monomer and may contain, as needed, a crosslinkable monomer having a functional group other than iodine group such as epoxy, carboxy, or active chlorine.

Examples of the iodine group-containing crosslinkable monomer include, but are not particularly limited to, 1-iodomethane, 1-iodoethane, 1-iodopropane, 2-iodopropane, 1-iodobutane, 2-iodobutane, 1-iodopentane, 1-iodohexane, 1-iodononane, 1-iodooctane, 1-iododecane, 1-iodododecane, diiodomethane, 1,2-diiodoethane, 1,3-diiodopropane, 1,4-diiodobutane, 1,5-diiodopentane, 1,6-diiodohexane, 1,8-diiodooctane, 1,9-diiodononane, 1,10-diiododecane, 1,12-diiodododecane, iodoform, and the like. These iodine compounds may be used alone or in combination of two or more.

The iodine content in the acrylic elastomer in the present embodiment can be determined according to the "iodine extraction absorptiometry" specified in JIS K0102: 2013. The iodine content in the acrylic elastomer in the present embodiment is controlled to be 0.1 to 2 mass % with respect to the total mass of the elastomer, as adhesive strength, processability, and flexibility are taken into consideration.

When the iodine content is less than 0.1 mass % with respect to the total mass of the elastomer, the laminate obtained does not have sufficient adhesion strength. Alternatively when the iodine content is more than 2 mass % with respect to the total mass of the elastomer, the acrylic elastomer has lower Mooney viscosity and become less processable. The iodine content of the acrylic elastomer in the present embodiment is preferably 0.1 to 1 mass % with respect to the total mass of the elastomer. It is thus possible to improve the adhesion strength additionally.

Alternatively, examples of the epoxy group-containing crosslinkable monomers include glycidyl acrylate, glycidyl methacrylate, allyl glycidyl ether, methallyl glycidyl ether, and the like. Examples of the carboxy group-containing crosslinkable monomers include acrylic acid, methacrylic acid, crotonic acid, 2-pentenoic acid, maleic acid, fumaric acid, itaconic acid, maleic acid monoalkyl esters, fumaric acid monoalkyl esters, monocyclohexyl maleate, monocyclohexyl fumarate, cinnamic acid, and the like. Further, examples of the active chlorine group-containing crosslinkable monomers include 2-chloroethyl vinyl ether, 2-chloroethyl acrylate, vinylbenzyl chloride, vinyl chloroacetate, allyl chloroacetate, and the like.

The content of the crosslinking group components derived from the crosslinkable monomers having a crosslinking group other than iodine group is preferably 0 to 1.5 mass % with respect to the total mass of the elastomer. When the content of the crosslinking group component other than iodine group is more than 1.5 mass %, the laminate hardens significantly when crosslinked, possibly leading to loss of its rubber elasticity.

The content of the crosslinking group component other than iodine group in the acrylic elastomer in the present embodiment can be determined by a known analytical method such as titration. The "content of the crosslinking group components," as used herein, is that of the crosslinking group component other than iodine group when it is a single component and the sum of the contents when it contains two or more.

[Other Monomers]

The acrylic elastomer in the present embodiment may be copolymerized with other monomers copolymerizable with the monomers described above in the range that does not impair the object of the present invention. Examples of the other monomers copolymerizable with the acrylic elastomer include, but are not limited to, alkyl vinyl ketones such as methyl vinyl ketone, vinyl ethers such as vinyl ethyl ether, allyl ethers such as allyl methyl ether, vinyl aromatic compounds such as styrene, α-methylstyrene, chlorostyrene, vinyltoluene, and vinylnaphthalene, vinyl nitriles such as acrylonitrile and methacrylonitrile, ethylenic unsaturated compounds such as acrylamide, propylene, butadiene, isoprene, pentadiene, vinyl chloride, vinylidene chloride, vinyl fluoride, vinylidene fluoride, ethylene, and vinyl propionate, vinyl acetate, and the like.

In particular when ethylene, among the monomers above, is copolymerized, it is possible to improve the strength of the acrylic elastomer drastically. However in order to obtain favorable low-temperature properties without deterioration in rubber elasticity, it is preferable to blend ethylene in an amount of 60 mass % or less with respect to the total mass of the elastomer.

The main chains of acrylic elastomers are often broken under the influence of heat, ultraviolet light, or others, leading to rapid deterioration of the mechanical properties such as tensile strength and breaking elongation. It is possible to adjust intermolecular crosslinking of the obtained acrylic elastomer by controlling the blending amount of readily crosslinkable vinyl acetate. When vinyl acetate is copolymerized into the main chain of the acrylic elastomer, even if the main chain of the acrylic elastomer is cleaved by thermal oxidizing, vinyl acetate, as it functions as a crosslinkable site, crosslinks the cleaved molecules again, thus permitting preservation of the mechanical properties, such as flexibility, of the acrylic elastomer.

It is also possible to adjust the degree of intermolecular crosslinking of the acrylic elastomer obtained by controlling the blending amount of vinyl acetate. However, the vinyl acetate content is preferably 20 mass % or less with respect to the total mass of the elastomer. When the vinyl acetate copolymerization rate is in the range, it is possible to suppress deterioration of its mechanical properties, while preserving the heat oxidizing resistance of the acrylic elastomer.

The acrylic elastomer in the present embodiment is prepared by copolymerizing the monomers described above by a known method such as emulsion polymerization, suspension polymerization, solution polymerization, or bulk polymerization. Emulsion polymerization is particularly preferable among various polymerization methods.

As described above in detail, because the acrylic elastomer in the present embodiment contains iodine groups as crosslinking groups in a particular amount, it gives a laminate improved in adhesiveness to a fluorine-based elastomer and thus superior in interlayer adhesiveness. In addition, it is possible by using the acrylic elastomer in the present embodiment to obtain an acrylic elastomer composition superior in interlayer adhesive strength and the laminate thereof with a fluorine-based elastomer and the crosslinked product therefrom can be used favorably as a molded article such as hose part, seal part, or antivibration rubber part.

Second Embodiment

The acrylic elastomer composition in the second embodiment of the present invention contains the acrylic elastomer of the first embodiment above, an organic peroxide, and an onium salt. The "acrylic elastomer composition" above is a composition wherein 50 mass % or more of the elastomers blended is the acrylic elastomer. Examples of the elastomers blended with the acrylic elastomer include epichlorohydrin rubbers, nitrile rubbers, hydrogenated nitrile rubbers, chloroprene rubbers, ethylene-propylene rubbers, silicone rubbers, chlorosulfonated polyethylene rubbers, and the like.

[Organic Peroxide]

The acrylic elastomer composition in the present embodiment contains an organic peroxide in an amount of 1 to 7 parts by mass with respect to 100 parts by mass of the major component acrylic elastomer. Addition of an organic peroxide to the acrylic elastomer composition in such an amount leads to improvement of the adhesiveness to the fluorine-based elastomer.

However when the content of the organic peroxide is less than 1 part by mass with respect to 100 parts by mass of the acrylic elastomer, the laminate obtained is lower in adhesive strength, leading to exfoliation. Alternatively when the organic peroxide content is more than 7 parts by mass with respect to 100 parts by mass of the acrylic elastomer, the laminate hardens significantly during preparation, losing its rubber elasticity. The organic peroxide content is preferably 1.5 to 5 parts by mass with respect to 100 parts by mass of the acrylic elastomer for improvement of adhesive strength, processability, and flexibility.

Examples of the organic peroxides added to the acrylic elastomer composition in the present embodiment include, but are not limited to, t-butyl cumyl peroxide, di-t-butyl peroxide, di-t-hexyl peroxide, 1,1-di-(t-hexylperoxy)-3,3,5-trimethylcyclohexane, 1,1-di-(t-hexylperoxy)cyclohexane, 1,1-di-(t-butylperoxy)-2-methylcyclohexane, 1,1-di-(t-butylperoxy)cyclohexane, 2,2-di-(t-butylperoxy)butane, 2,2-di-(4,4-di-(t-butylperoxy)cyclohexyl)propane, n-butyl 4,4-di-(t-butylperoxy)valerate, dicumyl peroxide, di(2-t-butylperoxy-isopropyl)benzene, 2,5-dimethyl-2,5-di(t-butylperoxy)hexyne, 2,5-dimethyl-2,5-di(t-butylperoxy) hexane, and the like.

Among the organic peroxides above, peroxyketals and dialkyl peroxides are preferable. As these compounds show favorable decomposition behavior in the production process for the laminate, it is possible to obtain a laminate superior in adhesiveness and rubber elasticity. The organic peroxides above may be used alone or in combination of two or more.

[Onium Salt]

The acrylic elastomer composition in the present embodiment contains an onium salt in an amount of 1 to 5 parts by mass with respect to 100 parts by mass of the major component acrylic elastomer. The onium salt functions as a crosslinking accelerator in the acrylic elastomer composition and, when used with the organic peroxide described above, permits production of a laminate improved in adhesiveness to the fluorine-based elastomer composition and thus superior in interlayer adhesiveness.

However when the onium salt content is less than 1 part by mass with respect to 100 parts by mass of the acrylic elastomer, the laminate obtained shows lower adhesiveness and causes separation of the acrylic elastomer layer from the fluorine-based elastomer layer. Alternatively when the onium salt content is more than 5 parts by mass with respect to 100 parts by mass of the acrylic elastomer, the acrylic elastomer composition becomes less processable. The onium salt content in the acrylic elastomer composition is preferably 2 to 5 parts by mass with respect to 100 parts by mass of the acrylic elastomer and it is thus possible to improve the adhesive strength and processability of the acrylic elastomer layer 11 additionally.

The onium salt added to the acrylic elastomer composition is not particularly limited and may be an organic ammonium salt, an organic phosphonium salt, or the like. Typical examples of the organic ammonium salts include tetra-n-butylammonium chloride, trimethylphenylammonium chloride, trimethylstearylammonium chloride, trimethyllaurylammonium chloride, trimethylcetylammonium chloride, dimethyldistearylammonium chloride, tributylbenzylammonium chloride, tetra-n-butylammonium bromide, methyltriphenylammonium bromide, ethyltriphenylammonium bromide, trimethylphenylammonium bromide, trimethylbenzylammonium bromide, stearyltrimethylammonium bromide, tetrabutylammonium thiocyanate, and the like.

Typical examples of the organic phosphonium salts include tetra-n-butylphosphonium chloride, tetra-n-butylphosphonium bromide, methyltriphenylphosphonium bromide, ethyltriphenylphosphonium bromide, butyltriphenylphosphonium bromide, hexyltriphenylphosphonium bromide, benzyltriphenylphosphonium bromide, tetraphenylphosphonium chloride, tetraphenylphosphonium bromide, 4-butoxybenzyltriphenylphosphonium bromide, allyltributylphosphonium chloride, 2-propynyltriphenylphosphonium bromide, methoxypropyltributylphosphonium chloride, and the like. These onium salts such as organic ammonium and phosphonium salts may be used alone or in combination of two or more.

[Other Components]

The acrylic elastomer composition in the present embodiment may contain a crosslinking agent and a crosslinking accelerator in addition to the components described above. It may further contain a filler, a reinforcing agent, a plasticizer, a lubricant, an antioxidant agent, a stabilizer, a silane-coupling agent, a multifunctional monomer, and/or the like according to purpose of the practical application of the product.

The crosslinking agent is not particularly limited and those commonly used for crosslinking acrylic rubber compositions can be added. The crosslinking agent having epoxy groups as crosslinking groups is preferably an imidazole compound and that containing carboxy groups as crosslinking groups is preferably a polyamine compound or a mixture thereof with a guanidine compound. Alternatively, the crosslinking agent containing active chlorine groups as crosslinking groups is preferably a sulfur compound, such as a combination of sulfur or a sulfur donor and a fatty acid metal soap or a combination of a dithiocarbamic acid salt or the derivative thereof and trithiocyanuric acid.

Examples of the imidazole compounds used as the crosslinking agents include 1-methylimidazole, 1,2-dimethylimidazole, 1-methyl-2-ethylimidazole, 1-benzyl-2-methylimidazole, 1-benzyl-2-ethylimidazole, 1-benzyl-2-ethyl-5-methylimidazole, 1-benzyl-2-phenylimidazole, 1-benzyl-2-phenylimidazole trimellitate salt, 1-aminoethylimidazole, 1-aminoethyl-2-methylimidazole, 1-aminoethyl-2-ethylimidazole, 1-cyanoethyl-2-methylimidazole, 1-cyanoethyl-2-phenylimidazole, 1-cyanoethyl-2-ethyl-4-methylimidazole, 1-cyanoethyl-2-undecylimidazole, 1-cyanoethyl-2-methylimidazole trimellitate, 1-cyanoethyl-2-phenylimidazole trimellitate, 1-cyanoethyl-2-ethyl-4-methylimidazole trimellitate, 1-cyanoethyl-2-undecyl-imidazole trimellitate, 2,4-diamino-6-[2'-methylimidazolyl-(1)']ethyl-s-triazine-isocyanuric acid adducts, 1-cyanoethyl-2-phenyl-4,5-di-(cyanoethoxymethynimidazole, N-(2-methylimidazolyl-1-ethyl)urea, N,N'-bis-(2-methylimidazolyl-1-ethyl)urea, 1-(cyanoethylaminoethyl)-2-methylimidazole, N,N'-[2-methylimidazolyl-(1)-ethyl]-adipoyldiamide, N,N'-[2-methylimidazolyl-(1)-ethyl]-dodecanedioyldiamide, N,N'-[2-methylimidazolyl-(1)-ethyl]-eicosanedioyldiamide, 2,4-diamino-6-[2'-methylimidazolyl-(1)']-ethyl-s-triazine, 2,4-diamino-6-[2'-undecylimidazolyl-(1)']-ethyl-s-triazine, 1-dodecyl-2-methyl-3-benzylimidazolium chloride, 1,3-dibenzyl-2-methylimidazolium chloride, and the like.

Examples of the polyamine compounds include aromatic polyamine compounds such as 4,4'-bis(4-aminophenoxy)biphenyl, 4,4'-diaminodiphenylsulfide, 1,3-bis(4-aminophenoxy)-2,2-dimethylpropane, 1,3-bis(4-aminophenoxy)benzene, 1,4-bis(4-aminophenoxy)benzene, 1,4-bis(4-aminophenoxy)pentane, 2,2-bis[4-(4-aminophenoxyl)phenyl]propane, 2,2-bis[4-(4-aminophenoxyl)phenyl]sulfone, 4,4'-diaminodiphenylsulfone, bis(4-3-aminophenoxy)phenylsulfone, 2,2-bis[4-(4-aminophenoxyl)phenyl]hexafluoropropane, 3,4'-diaminodiphenylether, 4,4'-diaminodiphenylether, 4,4'-diaminobenzanilide, and bis[4-(4-aminophenoxyl)phenyl]sulfone; aliphatic polyamine compounds such as hexamethylenediamine, hexamethylenediamine carbamate, N,N'-dicinnamylidene-1,6-hexanediamine, diethylenetriamine, triethylenetetramine, and tetraethylenepentamine; and the like.

Examples of the guanidine compounds include guanidine, tetramethylguanidine, dibutylguanidine, diphenylguanidine, di-o-tolylguanidine, and the like.

The amount of the crosslinking agents added is not particularly limited, but preferably 0.1 to 10 parts by mass with respect to 100 parts by mass of the acrylic elastomer composition excluding the crosslinking agent. It is thus possible to perform needed and sufficient crosslinking treatment.

The crosslinking accelerator, which is added for adjustment of the crosslinking velocity, can be added in any amount in the range that does not impair the advantageous effects of the present invention. When an epoxy group-containing acrylic elastomer is used as the crosslinking group, the crosslinking accelerator for use may be an epoxy resin-curing agent such as an organic acid, an acid anhydride, an amine, sulfur, or a sulfur compound.

The filler and the reinforcing agent may be any one of those commonly used in rubber application and typical examples thereof include carbon black, silica, clay, talc, calcium carbonate, and the like. The total amount of these fillers and reinforcing agents added is preferably 20 to 100 parts by mass with respect to 100 parts by mass of the acrylic elastomer composition excluding the fillers and reinforcing agents, from the viewpoint of effectiveness in reinforcing the acrylic elastomer.

The plasticizer for use may be any one of common plasticizers used in rubber application and examples thereof include ester-based plasticizers, polyoxyethylene ether-based plasticizers, trimellitate-based plasticizers, and the like. For needed and sufficient plasticization effectiveness, the amount of the plasticizer added is preferably 50 parts by mass or less with respect to 100 parts by mass of the acrylic elastomer composition excluding the plasticizer.

The multifunctional monomer for use may be any one of common multifunctional monomers used in rubber application and examples thereof include triallyl cyanurate, triallyl isocyanurate, trimethylolpropane triacrylate, and the like. The amount of the multifunctional monomer added is preferably 1 to 10 parts by mass with respect to 100 parts by mass of the acrylic elastomer composition excluding the multifunctional monomer.

The acrylic elastomer composition is prepared by kneading an acrylic elastomer, an organic peroxide, an onium salt and, as needed, other components such as crosslinking accelerators and fillers in a rubber-kneading apparatus commonly used. Examples of the rubber-kneading apparatuses used then include rolls, kneaders, Banbury mixers, internal mixers, biaxial extruders, and the like.

[Production Method for Acrylic Elastomer Composition]

The acrylic elastomer composition in the present embodiment is prepared by blending the iodine group-containing acrylic elastomer, the organic peroxide, and the onium salt described above respectively in certain amounts, adding, as needed, additionally other components such as a crosslinking accelerator and a filler, and kneading the resulting mixture in a common rubber-kneading apparatus at a temperature of the crosslink temperature or lower. The rubber-kneading apparatus used then may be a roll, a kneader, a Banbury mixer, an internal mixer, a biaxial extruder, or the like.

Although the timing of the organic peroxide and the onium salt blended is not particularly limited, it is preferably added before the acrylic elastomer is crosslinked, for example during the period when various compounding agents are added to and kneaded with the acrylic elastomer. It is thus possible to crosslink and bond the acrylic elastomer layer to the fluorine-based elastomer layer tightly even without special surface treatment.

As described above in detail, the acrylic elastomer composition in the present embodiment contains mainly an acrylic elastomer containing iodine groups as crosslinking groups in a particular amount and thus, it is improved in adhesiveness to the fluorine-based elastomer composition and gives a laminate superior in interlayer adhesiveness.

Third Embodiment

Hereinafter, the laminate in the third embodiment of the present invention will be described. FIG. 1 is a crosssectional view illustrating the configuration example of the laminate of the present embodiment. As shown in FIG. 1, the laminate 1 of the present embodiment is a laminate consisting of an acrylic elastomer layer 11 and a fluorine-based elastomer layer 12. The acrylic elastomer layer 11 is made of the acrylic elastomer composition of the second embodiment described above and the fluorine-based elastomer layer 12 is made of a fluorine-based elastomer composition containing mainly the fluorine-based elastomer having iodine groups as crosslinking groups.

Although FIG. 1 shows a laminate having a lamination structure consisting of an acrylic elastomer layer 11 and a fluorine-based elastomer layer 12, the present invention is not limited thereto and the laminate 1 may be a laminate consisting of one or more acrylic elastomer layers 11 and one or more fluorine-based elastomer layers 12. In such a case, the acrylic elastomer layers 11 and the fluorine-based elastomer layers 12 are laminated alternately.

In addition, the laminate 1 of the present embodiment may have a layer other than the acrylic elastomer layer 11 and the fluorine-based elastomer layer 12. For example, it may have a structure wherein reinforcing fibers are piled. In such a case, the reinforcing fibers are adhered to one or both of the acrylic elastomer layer 11 and the fluorine-based elastomer layer 12.

[Acrylic Elastomer Layer 11]

The acrylic elastomer layer 11 is prepared by molding the above-described acrylic elastomer composition of the second embodiment into the shape of layer or film.

[Fluorine-Based Elastomer Layer 12]

The fluorine-based elastomer layer 12 is prepared by molding the fluorine-based elastomer composition at least containing the fluorine-based elastomer having iodine groups as crosslinking groups into the shape of layer or film. The "fluorine-based elastomer composition" is a fluorine-based elastomer composition wherein 50 mass % or more of the elastomer is a fluorine-based elastomer. Examples of the elastomers blended with the fluorine-based elastomer include epichlorohydrin rubbers, nitrile rubbers, hydrogenated nitrile rubbers, chloroprene rubbers, ethylene-propylene rubbers, silicone rubbers, chlorosulfonated polyethylene rubbers, and the like.

<Fluorine-Based Elastomer>

The fluorine-based elastomer, which is the major component of the fluorine-based elastomer composition for preparation of the fluorine-based elastomer layer 12, is not particularly limited, if the elastomer contains fluorine atoms and additionally iodine groups as crosslinking groups. The fluorine-based elastomer containing iodine groups as crosslinking groups is prepared, for example, by polymerizing the mixture above in the presence of an iodine compound as chain-transfer agent.

<Organic Peroxide and Multifunctional Monomer>

The fluorine-based elastomer composition of the present embodiment may contain, as needed, an organic peroxide and/or a multifunctional monomer. The organic peroxide and the multifunctional monomer crosslink the same or different polymer chains of the fluorine-based elastomer with each other. It is possible by crosslinking the polymer chains to improve the tensile strength and also the elasticity of the fluorine-based elastomer layer 12. The crosslinked fluorine-based elastomer obtained by crosslinking with an organic peroxide or a multifunctional monomer, is superior in heat oxidizing resistance and acid resistance and thus suited as the laminate.

The organic peroxide blended to the fluorine-based elastomer composition is not particularly limited and examples thereof include t-butyl cumyl peroxide, di-t-butyl peroxide, di-t-hexyl peroxide, 1,1-di-(t-hexylperoxy)-3,3,5-trimethylcyclohexane, 1,1-di-(t-hexylperoxy)cyclohexane, 1,1-di-(t-butylperoxy)-2-methylcyclohexane, 1,1-di-(t-butylperoxy)cyclohexane, 2,2-di-(t-butylperoxy)butane, 2,2-di-(4,4-di-(t-butylperoxy)cyclohexyl)propane, n-butyl 4,4-di-(t-butylperoxy)valerate, dicumyl peroxide, di(2-t-butylperoxyisopropyl)benzene, 2,5-dimethyl-2,5-di(t-butylperoxy)hexyne, 2,5-dimethyl-2,5-di(t-butylperoxy)hexane, and the like.

The amount of the organic peroxide blended is preferably 0.05 to 10 parts by mass and more preferably 1.0 to 5 parts by mass, with respect to 100 parts by mass of the major component fluorine-based elastomer. It is because, when the blending amount of the organic peroxide is less than 0.05 parts by mass with respect to 100 parts by mass of the fluorine-based elastomer, the organic peroxide is less effective in crosslinking reaction, giving a crosslinked product with insufficient strength. Alternatively when the blending amount of the organic peroxide is more than 10 parts by mass with respect to 100 parts by mass of the fluorine-based elastomer, the crosslinked product becomes harder, possibly losing its rubber elasticity.

On the other hand, the multifunctional monomer is also not particularly limited and examples thereof include triallyl cyanurate, triallyl isocyanurate, triacrylformal, triallyl trimellitate, N,N'-m-phenylene bismaleimide, dipropargyl terephthalate, diallyl phthalate, tetraallylterephthalamide, triallyl phosphate, and the like.

The blending amount of these multifunctional monomers is preferably 0.001 to 20 parts by mass with respect to 100 parts by mass of the major component fluorine-based elastomer. When the blending amount of the multifunctional monomers is less than 0.001 parts by mass with respect to 100 parts by mass of the fluorine-based elastomer, the multifunctional monomers become less effective in crosslinking the composition, leading to deterioration of the strength of the crosslinked product. Alternatively when the blending amount of the multifunctional monomers is more than 20 parts by mass with respect to 100 parts by mass of the fluorine-based elastomer, the crosslinked product becomes harder, possibly losing its rubber elasticity.

These organic peroxides and multifunctional monomers may be used alone or in combination of two or more.

<Other Components>

The fluorine-based elastomer composition may contain, as needed, various additives such as carbon black, reinforcing agents, softening agents, antioxidant agents, crosslinking agents, crosslinking accelerators, fillers, processing aids, plasticizers, colorants, stabilizers, adhesion assistants, acid acceptors, release agents, conductivity-enhancing agents, heat conductivity enhancers, surface non-adhesive agents, flexibility-providing agents, heat resistance improvers, and flame retardants. One or more crosslinking agents and crosslinking accelerators other than the organic peroxides and the multifunctional monomers described above may be blended.

<Production Method for Fluorine-Based Elastomer Composition>

The fluorine-based elastomer composition in the present embodiment is prepared by mixing the iodine group-containing fluorine-based elastomer described above, as needed, an organic peroxide and an multifunctional monomer, and additionally other compounding agents such as fillers and kneading the resulting mixture in a rubber-kneading apparatus commonly used. Examples of the rubber-kneading apparatus for use include rolls, kneaders, Banbury mixers, internal mixers, biaxial extruders, and the like.

When an organic peroxide or a multifunctional monomer is added to the fluorine-based elastomer composition, the addition method is not particularly limited. It is possible to achieve strong interlayer adhesiveness by using a method of adding it before crosslinking adhesion between the fluorine-based elastomer layer 12 and the acrylic elastomer layer 11, for example during the period when the fluorine elastomer and various compounding agents are kneaded.

Because the laminate 1 of the present embodiment has an acrylic elastomer layer formed with a composition containing an acrylic elastomer having iodine groups as crosslinking groups and a fluorine-based elastomer layer formed with a composition containing a fluorine-based elastomer having iodine groups as crosslinking groups, the acrylic elastomer and the fluorine-based elastomer are cocrosslinkable with each other. It is possible in this way to improve the adhesiveness between the acrylic elastomer layer and the fluorine-based elastomer layer.

Fourth Embodiment

The crosslinked product in the fourth embodiment of the present invention is prepared by crosslinking the laminate of the third embodiment described above. The acrylic elastomer composition layer 11 and the fluorine elastomer composition layer 12 are desirably crosslinked and bonded to each other, as the elastomers are crosslinked with each other at the interface. Thus in the present embodiment, these layers are crosslinked, as they are superimposed, to give a crosslinked product. It is possible in this way to obtain a laminate further superior in interlayer adhesive strength.

The crosslinking method used then is not particularly limited and a common crosslinking method such as press crosslinking, steam crosslinking, or electron beam crosslinking may be used. The crosslinking temperature and the crosslinking period may be selected properly according to the composition of the elastomer compositions and the kind of the crosslinking agent used, but normally, the crosslinking reaction is carried out at 100 to 200° C. for 1 to 10 hours.

One or both of the acrylic elastomer layer 11 and the fluorine-based elastomer layer 12 may be surface-treated before the laminate 1 is crosslinked. As the acrylic elastomer and the fluorine-based elastomer are cocrosslinkable in the laminate 1 described above, it is possible to achieve strong crosslink adhesiveness even without such surface treatment.

Because the crosslinked product of the present embodiment is prepared by crosslinking the laminate of the third embodiment, the interlayer adhesiveness between the fluorine-based elastomer layer and the acrylic elastomer layer is increased. In particular in the laminate of the third embodiment described above, as both of the major component elastomers of the acrylic elastomer layer and the fluorine-based elastomer layer contain iodine groups as crosslinking groups, the elastomers are cocrosslinked with each other. As a result, it is possible without complication of the production process to integrate multiple elastomer layers and prepare a crosslinked laminate wherein the elastomer layers are tightly adhered to each other.

Fifth Embodiment

Hereinafter, the molded article in the fifth embodiment of the present invention will be described. The crosslinked product of the fourth embodiment described above can be molded into various shapes after crosslinking. Thus, the molded article of the present embodiment, which is prepared by molding the crosslinked product of the fourth embodiment described above, is, for example, a hose part, a seal part, or an antivibration rubber part prepared with the crosslinked product of the fourth embodiment.

Examples of the hose parts include transmission oil cooler hoses, engine oil cooler hoses, air duct hoses, turbo intercooler hoses, hot air hoses, radiator hoses, power steering hoses, fuel-line hoses, drain-line hoses, and others of automobiles, construction machines, hydraulic equipment, and the like. These hose parts may have reinforcing filaments or wires embedded in the hoses or wound on the outer layer of the rubber hoses, as commonly practiced.

Examples of the seal parts include engine head cover gaskets, oil pan gaskets, oil seals, lip seal packings, O-rings, transmission seal gaskets, crank shafts, cam shaft seal gaskets, valve stems, power steering seals, belt cover seals, constant-velocity-joint boots, rack-and-pinion boots, and the like.

Examples of the antivibration rubber parts include damper pulleys, center support cushions, suspension bushings, and the like.

The molded article of the present embodiment, which is prepared with the crosslinked product of the fourth embodiment, is superior in interlayer adhesiveness and additionally shows favorable low-temperature resistance by the acrylic elastomer layer and favorable heat oxidizing resistance by the fluorine-based elastomer layer. Accordingly, it is possible to produce at low cost a molded article superior in durability, heat oxidizing resistance, and low-temperature resistance.

EXAMPLES

Hereinafter, advantageous effects of the present invention will be described specifically with reference to Examples and Comparative Examples of the present invention. In the Examples below, the laminates of Examples and Comparative Examples were prepared respectively from acrylic elastomer compositions different in composition and the interlayer adhesiveness thereof was examined after crosslinking.

Specifically, eight kinds of acrylic elastomers A to H were first prepared by the methods and under the conditions shown below. The methods of analyzing the acrylic elastomer are as follows:

(1) Iodine Content

The iodide ion content (mass %) was determined according to JIS K0102: 2013 (36.1 Iodine extraction absorptiometry).

(2) Epoxy Group Content

The epoxy group content (mass %) was determined by measurement according to the method specified in JIS K7236: 2001.

(3) Carboxy Group Content

The carboxy group content (mass %) was determined by solubilization of the acrylic elastomer in toluene and subsequent neutralization titration using potassium hydroxide.

(4) Monomer Component

The component ratio of each monomer unit (mass ratio) was determined by nuclear magnetic resonance spectroscopy.

<Preparation of Acrylic Elastomer A>

17 kg of aqueous 4 mass % partially saponified polyvinylalcohol solution and 22 g of sodium acetate were placed in a reaction container having a capacity of 40 liters and the mixture was mixed thoroughly with a stirrer, to give a homogeneous suspension. After substitution of the tank-head air with nitrogen, the mixture was further stirred. After the mixture was kept at 55° C., monomer components (5.5 kg of ethyl acrylate, 5.5 kg of n-butyl acrylate, and 0.011 kg of 1,10-diiododecane) and 2 kg of aqueous 0.5 mass % t-butyl hydroperoxide solution were added thereto through separate injection ports, to initiate polymerization. The temperature in the tank was kept at 55° C. during the reaction and the reaction was terminated after 6 hours, to give a polymer solution.

Subsequently, 20 kg of aqueous 0.3 mass % sodium borate solution was added to the resulting polymer solution for solidification of the polymer. The polymer was dehydrated and dried, to give an acrylic elastomer A. The acrylic elastomer A had an iodine content of 0.1 mass % and the following copolymer composition by mass ratio: ethyl acrylate monomer unit:n-butyl acrylate monomer unit=50.0:49.9.

<Preparation of Acrylic Elastomer B>

An acrylic elastomer B was prepared by a method under a condition similar to those used for preparation of the acrylic elastomer A above, except that monomer components used as the raw materials for the acrylic elastomer was changed to 5.5 kg of ethyl acrylate, 5.5 kg of n-butyl acrylate, and 0.066 kg of 1,6-diiodohexane.

The acrylic elastomer B had an iodine content of 0.6 mass % and the following copolymer composition by mass ratio: ethyl acrylate monomer unit:n-butyl acrylate monomer unit=50.0:49.4.

<Preparation of Acrylic Elastomer C>

An acrylic elastomer C was prepared by a method under a condition similar to those used for preparation of the acrylic elastomer A above, except that monomer components used as the raw materials for the acrylic elastomer was changed to 5.5 kg of ethyl acrylate, 5.5 kg of n-butyl acrylate, and 0.22 kg of 1,6-diiodohexane.

The acrylic elastomer C had an iodine content of 2.0 mass % and the following copolymer composition by mass ratio: ethyl acrylate monomer unit:n-butyl acrylate monomer unit=49.0:49.0.

<Preparation of Acrylic Elastomer D>

17 kg of aqueous 4 mass % partially saponified polyvinylalcohol solution and 22 g of sodium acetate were placed in a reaction container having a capacity of 40 liters and the mixture was mixed thoroughly with a stirrer, to give a homogeneous suspension. After substitution of the tank-head air with nitrogen, ethylene was supplied under pressure into the tank head and the pressure was adjusted to 4 MPa. The mixture was further stirred and, after the mixture was kept at 55° C., monomer components (5.5 kg of ethyl acrylate, 5.5 kg of n-butyl acrylate, and 0.066 kg of 1,10-diiododecane) and 2 kg of aqueous 0.5 mass % t-butyl hydroperoxide solution were added thereto through separate injection ports, to initiate polymerization. The temperature in the tank was kept at 55° C. during the reaction and the reaction was terminated after 6 hours, to give a polymer solution.

Subsequently, 20 kg of aqueous 0.3 mass % sodium borate solution was added to the resulting polymer solution for solidification of the polymer. The polymer was dehydrated and dried, to give an acrylic elastomer D. The acrylic elastomer D had an iodine content of 0.6 mass % and the following copolymer composition by mass ratio: ethyl acrylate monomer unit:n-butyl acrylate monomer unit:ethylene monomer unit=48.4:48.0:3.0.

<Preparation of Acrylic Elastomer E>

An acrylic elastomer E was prepared by a method under a condition similar to those used for preparation of the acrylic elastomer A above, except that monomer components used as the raw materials for the acrylic elastomer was changed to 5.5 kg of ethyl acrylate, 5.5 kg of n-butyl acrylate, and 0.11 kg of 1,10-diiododecane and additionally 0.168 kg of mono-n-butyl malate was added.

The acrylic elastomer E had an iodine content of 1 mass %, a carboxy group content of 0.4 mass %, and the following copolymer composition by mass ratio: ethyl acrylate monomer unit:n-butyl acrylate monomer unit=49.5:49.1.

<Preparation of Acrylic Elastomer F>

An acrylic elastomer F was prepared by a method under a condition similar to those used for preparation of the acrylic elastomer A above, except that monomer compochanged to 5.5 kg of ethyl acrylate, 5.5 kg of n-butyl acrylate, and 0.066 kg of 1,10-diiododecane and additionally 0.156 kg of glycidyl methacrylate was added.

The acrylic elastomer F had an iodine content of 0.6 mass %, an epoxy group content of 0.4 mass %, and the following copolymer composition by mass ratio: ethyl acrylate monomer unit:n-butyl acrylate monomer unit:ethylene monomer unit=48.0:48.0:3.0.

<Preparation of Acrylic Elastomer G>

An acrylic elastomer G was prepared by a method under a condition similar to those used for preparation of the acrylic elastomer A above, except that monomer components used as the raw materials for the acrylic elastomer was changed to 5.5 kg of ethyl acrylate, 5.5 kg of n-butyl acrylate, and 0.11 kg of 1,10-diiododecane and additionally 0.625 kg of glycidyl methacrylate was added.

The acrylic elastomer G had an iodine content of 1.0 mass %, an epoxy group content of 1.6 mass %, and the following copolymer composition by mass ratio: ethyl acrylate monomer unit:n-butyl acrylate monomer unit=49.0:48.4.

<Preparation of Acrylic Elastomer H>

An acrylic elastomer H was prepared by a method under a condition similar to those used for preparation of the acrylic elastomer A above, except that monomer components used as the raw materials for the acrylic elastomer was changed to 5.5 kg of ethyl acrylate and 5.5 kg of n-butyl acrylate and 1,10-diiododecane was not used (0 kg). The acrylic elastomer H had the following copolymer composition by mass ratio: ethyl acrylate monomer unit:n-butyl acrylate monomer unit=50.0:50.0.

<Preparation of Laminates>

Each of the (uncrosslinked) fluorine-based elastomer compositions prepared in the compositions (mass ratio) shown in the following Table 1 was molded into the shape of a sheet having a thickness of 2.5 mm, forming a fluorine-based elastomer layer.

TABLE 1

| Component | Composition (part by mass) |
|---|---|
| Fluorine elastomer | 100 |
| Carbon MT | 20 |
| Triallyl isocyanurate | 4 |
| Perhexa V40 | 1.5 |

The acrylic elastomers A to H described above and other materials were kneaded with an 8-inch open roll in the composition (mass ratio) shown in the following Tables 2 and 3, to give respectively acrylic elastomer compositions of Examples 1 to 11 and Comparative Examples 1 to 7. Each of these (uncrosslinked) acrylic elastomer compositions was then molded into the shape of a sheet having a thickness of 2.5 mm, forming an acrylic elastomer layer. The acrylic elastomer layer and the fluorine-based elastomer layer described above were bonded to each other, and the laminate was heat-treated, as it was, in a steam-heated heat press at 160° C. for 35 minutes, to give a crosslinked product of each laminate in Examples and Comparative Examples.

TABLE 2

| | Component | Example 1 | Example 2 | Example 3 | Example 4 | Example 5 | Example 6 | Example 7 | Example 8 | Example 9 | Example 10 | Example 11 |
|---|---|---|---|---|---|---|---|---|---|---|---|---|
| Acrylic elastomer | A | 100 | — | — | — | — | — | — | — | — | — | — |
| | B | — | 100 | — | — | 100 | — | — | — | — | — | — |
| | C | — | — | 100 | — | — | — | — | — | — | — | — |
| | D | — | — | — | 100 | — | — | — | — | — | — | — |
| | E | — | — | — | — | — | 100 | — | — | — | — | — |
| | F | — | — | — | — | — | — | 100 | 100 | 100 | 100 | 100 |
| | G | — | — | — | — | — | — | — | — | — | — | — |
| | H | — | — | — | — | — | — | — | — | — | — | — |
| Lubricant | Stearic acid | 1 | 1 | 1 | 1 | 1 | 1 | 1 | 1 | 1 | 1 | 1 |
| Carbon black | Carbon HAF | 55 | 55 | 55 | 55 | 55 | 55 | 55 | 55 | 55 | 55 | 55 |
| Organic peroxide | Perhexa V40 | 1.5 | 1.5 | 1.5 | 1.5 | 1.5 | 1.5 | 1.5 | 5 | 7 | 1.5 | 1.5 |
| Onium salt | Stearyltrimethylammonium bromide | 2 | 2 | 2 | 2 | — | 2 | 2 | 2 | 2 | 1 | 5 |
| | Tetra-n-butylphosphonium bromide | — | — | — | — | 2 | — | — | — | — | — | — |
| Adhesiveness test result | Exfoliation state | R | R | R | R | R | R | R | R | R | R | R |
| | Peeling strength (N/mm) | 1.2 | 1.6 | 1.9 | 1.7 | 1.6 | 2.5 | 4.9 | 4.7 | 4.5 | 3.5 | 4.8 |

TABLE 3

| | Component | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|
| Acrylic elastomer | A | — | — | — | — | — | — | — |
| | B | — | — | — | — | — | — | — |
| | C | — | — | — | — | — | — | — |
| | D | — | — | — | — | — | — | — |
| | E | — | — | — | — | — | — | — |
| | F | — | — | 100 | 100 | 100 | 100 | 100 |
| | G | 100 | — | — | — | — | — | — |
| | H | — | 100 | — | — | — | — | — |
| Lubricant | Stearic acid | 1 | 1 | 1 | 1 | 1 | 1 | 1 |
| Carbon black | Carbon HAF | 55 | 55 | 55 | 55 | 55 | 55 | 55 |
| Organic peroxide | Perhexa V40 | 1.5 | 1.5 | 1.5 | — | — | 1.5 | 10 |

TABLE 3-continued

| Component | | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|
| Onium salt | Stearyltrimethylammonium bromide | 2 | 2 | — | 2 | — | 7 | 2 |
| | Tetra-n-butylphosphonium bromide | — | — | — | — | — | — | — |
| Adhesiveness test result | Exfoliation state | hardened | foamed | RT | RT | foamed | hardened | hardened |
| | Peeling strength (N/mm) | — | — | 0.5 | 1.2 | — | — | — |

Reagents used in the Examples and Comparative Examples in Tables 1 to 3 above are as follows:

Fluorine-based elastomer: DAI-EL G801 (produced by Daikin Industries, Ltd., containing iodine groups)

Carbon MT: Asahi #15 (produced by Asahi Carbon Co., Ltd.)

Carbon HAF: Seast #3 (produced by Tokai Carbon Co., Ltd.)

Triallyl isocyanurate (produced by Tokyo Chemical Industry Co., Ltd.)

Perhexa V40 (produced by NOF Corporation)

Stearic acid: LUNAC S-90 (produced by Kao Corporation)

Stearyltrimethylammonium bromide (produced by Tokyo Chemical Industry Co., Ltd.)

Tetra-n-butylphosphonium bromide (produced by Tokyo Chemical Industry Co., Ltd.)

Then, the interlayer adhesiveness (peeling strength, exfoliation state) of the crosslinked product (test specimen) of each of the laminates of Examples and Comparative Examples was examined by the methods shown below.

(Interlayer Adhesiveness)

The interlayer adhesiveness was evaluated based on the peeling strength of each test specimen, which was determined by performing 180° peel test of each test specimen on a tensile tester at a peeling rate of 50 mm/minute. In addition, the exfoliation state of each test specimen was observed. The results above are summarized in Tables 2 and 3. In the test results of exfoliation state shown in Tables 2 and 3 above, "R" indicates that the test specimen was broken; "RT" indicates that the test specimen was separated at the interface; "Hardened" indicates that the test specimen lost rubber elasticity, prohibiting measurement; and "Foamed" indicates that the lamination face of the test specimen foamed, prohibiting measurement.

As obvious from the results in Tables 2 and 3 above, the laminates of Examples 1 to 11, which were prepared within the technical scope of the present invention, gave crosslinked laminates superior in interlayer adhesive strength between the fluorine-based elastomer layer and the acrylic elastomer layer even without special surface treatment. In contrast, the crosslinked laminates of Comparative Examples 1 to 7 were inferior in interlayer adhesiveness to those of Examples 1 to 11.

These results demonstrate that it is possible according to the present invention to provide a laminate, a crosslinked product, and a molded article superior in interlayer adhesiveness.

REFERENCE SIGNS LIST

1: Laminate
11: Acrylic elastomer layer
12: Fluorine-based elastomer layer

The invention claimed is:

1. An acrylic elastomer, comprising iodine groups as crosslinking groups and having an iodine content of 0.1 to 2 mass % with respect to the total mass of the elastomer, wherein the iodine groups are derived from at least one iodine group-containing crosslinkable monomer selected from the group consisting of diiodomethane, 1,2-diiodoethane, 1,3-diiodopropane, 1,4-diiodobutane, 1,5-diiodopentane, 1,6-diiodohexane, 1,8-diiodooctane, 1,9-diiodononane, 1,10-diiododecane, 1,12-diiodododecane and iodoform.

2. The acrylic elastomer according to claim 1, further comprising at least one crosslinking group selected from the group consisting of epoxy, carboxy, and active chlorine and having a content of the crosslinking group component other than iodine group of 1.5 mass % or less with respect to the total mass of the elastomer.

3. An acrylic elastomer composition, comprising 100 parts by mass of the acrylic elastomer according to claim 1, 1 to 7 parts by mass of an organic peroxide, and 1 to 5 parts by mass of an onium salt.

4. The acrylic elastomer composition according to claim 3, wherein the organic peroxide is a peroxyketal and/or a dialkyl peroxide.

5. The acrylic elastomer composition according to claim 3, wherein the onium salt is an organic ammonium salt and/or an organic phosphonium salt.

6. A laminate comprising an acrylic elastomer layer of the acrylic elastomer composition according to claim 3 and a fluorine-based elastomer layer of a fluorine-based elastomer composition mainly containing a fluorine-based elastomer having iodine groups as crosslinking groups.

7. A crosslinked product obtained by crosslinking the laminate according to claim 6.

8. A molded article, comprising the crosslinked product according to claim 7.

9. The molded article according to claim 8 that is a hose part, a seal part, or an antivibration rubber part.

10. The acrylic elastomer according to claim 1, wherein the crosslinkable monomer is at least one of 1,6-diiodohexane and 1,10-diiododecane.

11. The crosslinked product according to claim 7, wherein the acrylic elastomer layer and the fluorine-based elastomer layer are crosslinked and bonded to each other as the elastomers are crosslinked with each other at the interface.

* * * * *